United States Patent
Voges

(10) Patent No.: US 10,907,534 B1
(45) Date of Patent: Feb. 2, 2021

(54) ENGINE WITH SLIDING SUPERCHARGER

(71) Applicant: Harley-Davidson Motor Company Group, LLC, Milwaukee, WI (US)

(72) Inventor: Johann Voges, Brookfield, WI (US)

(73) Assignee: HARLEY-DAVIDSON MOTOR COMPANY GROUP, LLC, Milwaukee, WI (US)

( * ) Notice: Subject to any disclaimer, the term of this patent is extended or adjusted under 35 U.S.C. 154(b) by 0 days.

(21) Appl. No.: 16/571,806

(22) Filed: Sep. 16, 2019

(51) Int. Cl.
*F02B 33/00* (2006.01)
*F02B 33/34* (2006.01)
*B62K 11/00* (2006.01)

(52) U.S. Cl.
CPC .............. *F02B 33/34* (2013.01); *B62K 11/00* (2013.01)

(58) Field of Classification Search
CPC .................................. F02B 33/34; B62K 11/00
See application file for complete search history.

(56) References Cited

U.S. PATENT DOCUMENTS

| | | | | |
|---|---|---|---|---|
| 5,085,199 | A * | 2/1992 | Sado | F02B 67/10 |
| | | | | 123/198 R |
| 5,224,459 | A | 7/1993 | Middlebrook | |
| 6,478,701 | B1 * | 11/2002 | Yasuhara | F16H 7/12 |
| | | | | 305/147 |
| 7,731,613 | B2 * | 6/2010 | Ishida | F16H 55/563 |
| | | | | 474/19 |
| 9,726,075 | B2 | 8/2017 | Arnold et al. | |
| 2005/0028795 | A1 * | 2/2005 | Benson | F02B 33/40 |
| | | | | 123/559.1 |
| 2005/0066946 | A1 * | 3/2005 | Barnes | F02B 29/0412 |
| | | | | 123/563 |
| 2008/0066722 | A1 * | 3/2008 | Jones | F02B 39/14 |
| | | | | 123/559.1 |
| 2011/0172898 | A1 * | 7/2011 | Eiraku | F02D 41/18 |
| | | | | 701/103 |
| 2011/0303198 | A1 * | 12/2011 | Thomson | F02B 33/38 |
| | | | | 123/564 |
| 2012/0006305 | A1 | 1/2012 | Hagel et al. | |
| 2013/0172137 | A1 * | 7/2013 | Antchak | F16H 7/12 |
| | | | | 474/133 |

(Continued)

FOREIGN PATENT DOCUMENTS

| | | |
|---|---|---|
| JP | 4285350 A2 | 10/1992 |
| JP | 2001132470 A2 | 5/2001 |

OTHER PUBLICATIONS

Toyota Nascar Water Pump with Universal Motor Plate, publicly available prior to Sep. 16, 2019.

*Primary Examiner* — Shafiq Mian
(74) *Attorney, Agent, or Firm* — Michael Best & Friedrich LLP

(57) ABSTRACT

A supercharged engine includes a crankshaft operable to receive and output power produced by combustion within the engine. The crankshaft is rotatably supported in a case, and a supercharger is driven from the crankshaft by an endless drive member. The supercharger is adapted to compress intake air supplied to the engine when driven from the crankshaft. A mount has a track slidably supporting the supercharger relative to the case so that tension in the endless drive member is adjustable and set in relation to a position of the supercharger relative to the case. The mount is self-adjusting to maintain an operating tension in the endless drive member.

20 Claims, 8 Drawing Sheets

(56) References Cited

U.S. PATENT DOCUMENTS

2015/0275743 A1* 10/2015 Ohmori ............... F02M 35/162
                                                    123/563
2017/0114731 A1*  4/2017 Ichi .................... F02D 41/0005
2020/0141283 A1*  5/2020 Gao ..................... F16H 7/1281

* cited by examiner

ENGINE WITH SLIDING SUPERCHARGER

BACKGROUND

The present disclosure relates to internal combustion engines. In particular, the disclosure relates to the mounting of a supercharger on an internal combustion engine.

SUMMARY

In one aspect, the invention provides a supercharged engine including a crankshaft operable to receive and output power produced by combustion within the engine. The engine includes case in which the crankshaft is rotatably supported. A supercharger is driven from the crankshaft by an endless drive member, the supercharger being adapted to compress intake air supplied to the engine when driven from the crankshaft. A mount has a track slidably supporting the supercharger relative to the case so that tension in the endless drive member is adjustable and set in relation to a position of the supercharger relative to the case. The mount is self-adjusting to maintain an operating tension in the endless drive member.

In another aspect, the invention provides a supercharged engine. An air intake system includes a supercharger operable to supply compressed air to an intake manifold of the engine. The supercharger is supported on the engine for sliding movement by a mount having a track. An endless drive member is wrapped around a driven wheel of the supercharger and around a drive wheel supplied with power from a crankshaft of the engine to which at least one piston of the engine is joined. The endless drive member defines a first linear belt path from the driven wheel to the drive wheel, and a second linear belt path from the drive wheel to the driven wheel.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
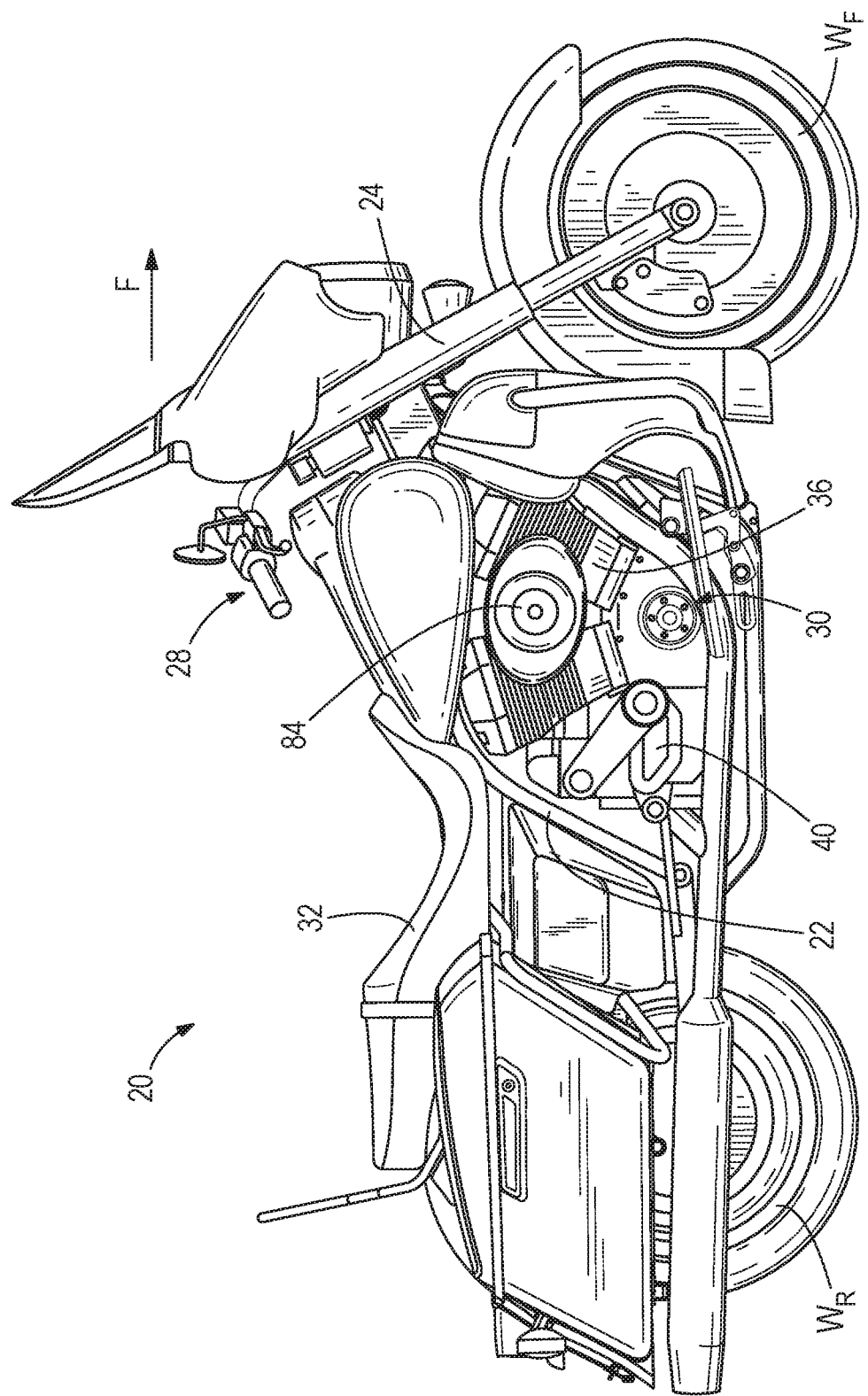
FIG. 1 is a side view of a motorcycle having a supercharged engine according to one embodiment of the present disclosure.

FIG. 1 illustrates a vehicle in the form of a motorcycle 20 including front and rear wheels $W_F$, $W_R$ coupled to a frame 22. The front wheel is supported by a fork 24 including a pair of fork tubes. A steering assembly 28 including handlebars provided for grasping by the operator is directly coupled to the fork tubes 24 for steering the front wheel. The rear wheel $W_R$ is a drive wheel that receives torque from a powertrain 30 to propel the motorcycle 20. At least one straddle seat 32 is provided at an exposed upper surface of the motorcycle 20 for supporting a rider, and optionally a passenger. Although shown as a motorcycle 20 with an open cockpit and no surrounding body, aspects of the invention may be provided in alternate styles of vehicles including different styles of two-wheeled vehicles, on or off-road vehicles having more than two wheels, and vehicles that partially or fully encapsulate the operator.

The powertrain 30 includes an internal combustion engine 36 (e.g., a gasoline burning V-twin engine). In some constructions, the powertrain 30 is a hybrid powertrain that also includes at least one electric machine (e.g., rotary motor operable with electrical energy to output torque, and operable in a separate mode as a generator to convert rotational kinetic energy into electrical energy for consumption and/or storage). Such an electric machine can be implemented as an integrated starter-generator, either on or spaced from a crankshaft 46 of the engine 36. Alternately or additionally, the powertrain 30 can include an electric motor that can be operated independently of the operating speed of the engine 36. The powertrain 30 further includes a transmission assembly, or simply "transmission" 40, which is downstream of the engine 36. The transmission can be a multi-speed transmission having multiple gear pairs located on two parallel transmission shafts. The gear setting or selection of the transmission, which may also include neutral, may be selectable by the rider, e.g., manually or electro-mechanically in the manner of a manual transmission. Further details describing components of the powertrain 30 are described below.

Figure 2:
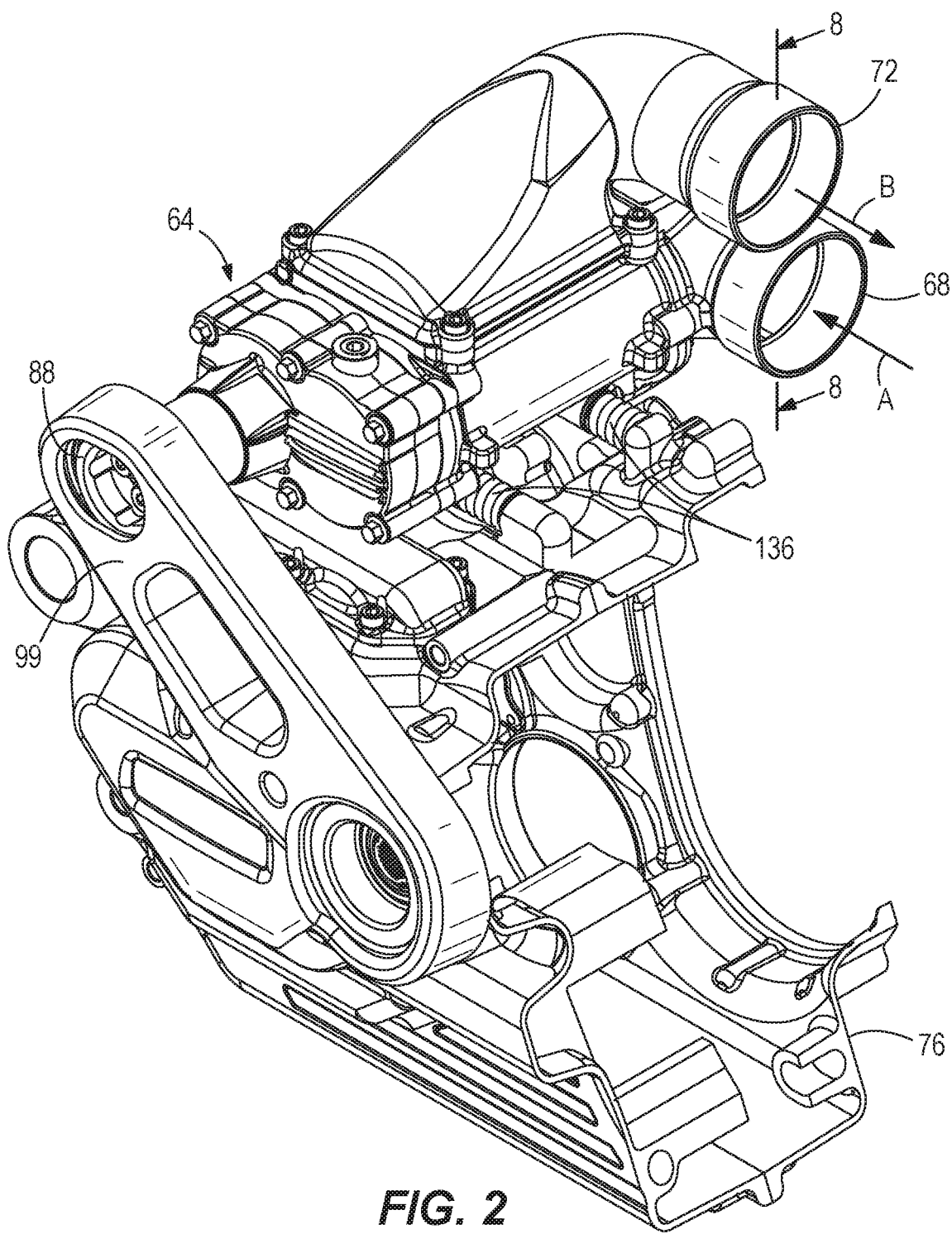
FIG. 2 is a perspective view of a portion of the supercharged engine of FIG. 1.
Figure 3:
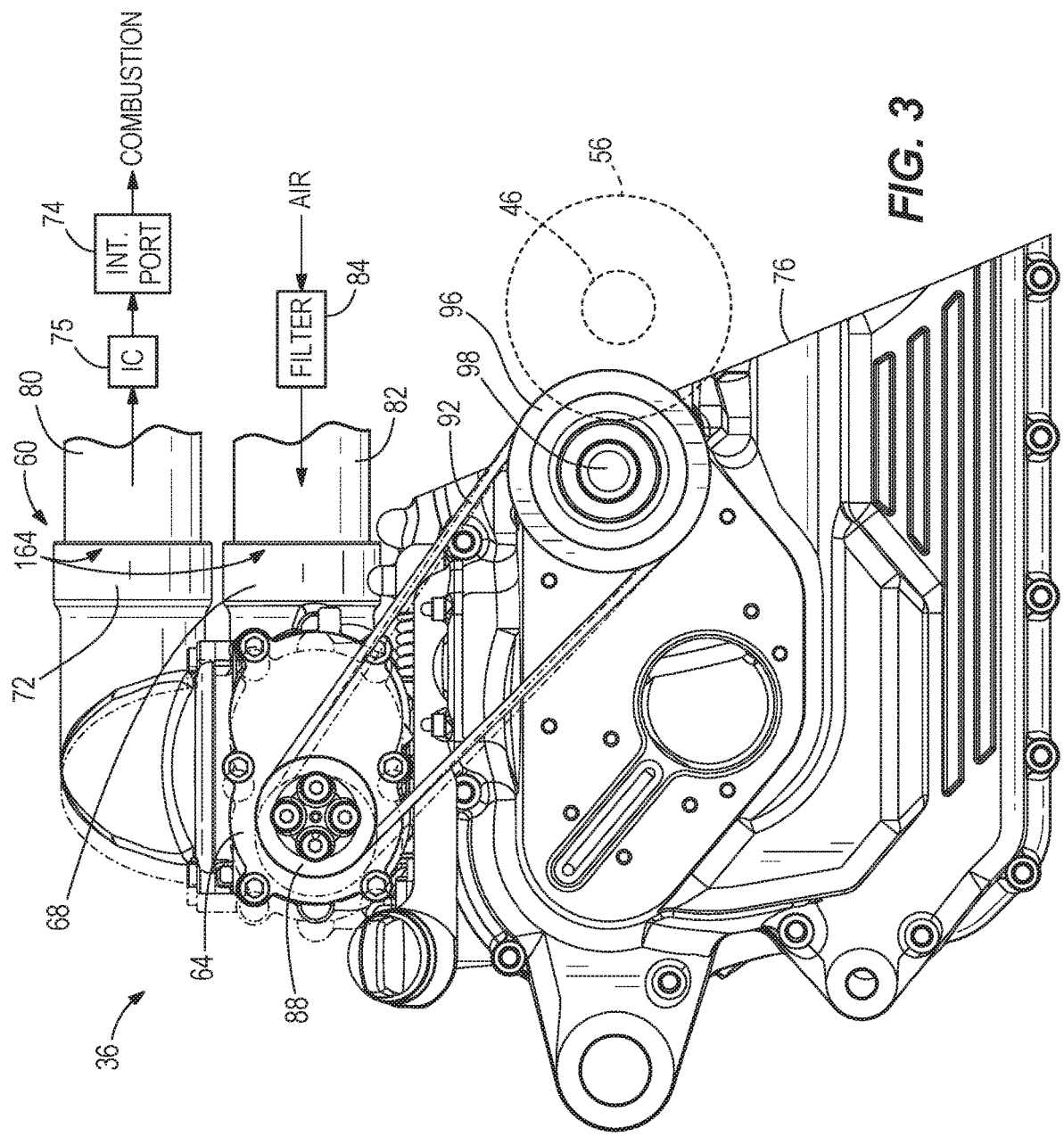
FIG. 3 is side view of the engine portion of FIG. 2, illustrating a range of movement of the supercharger on the engine.
Figure 4:
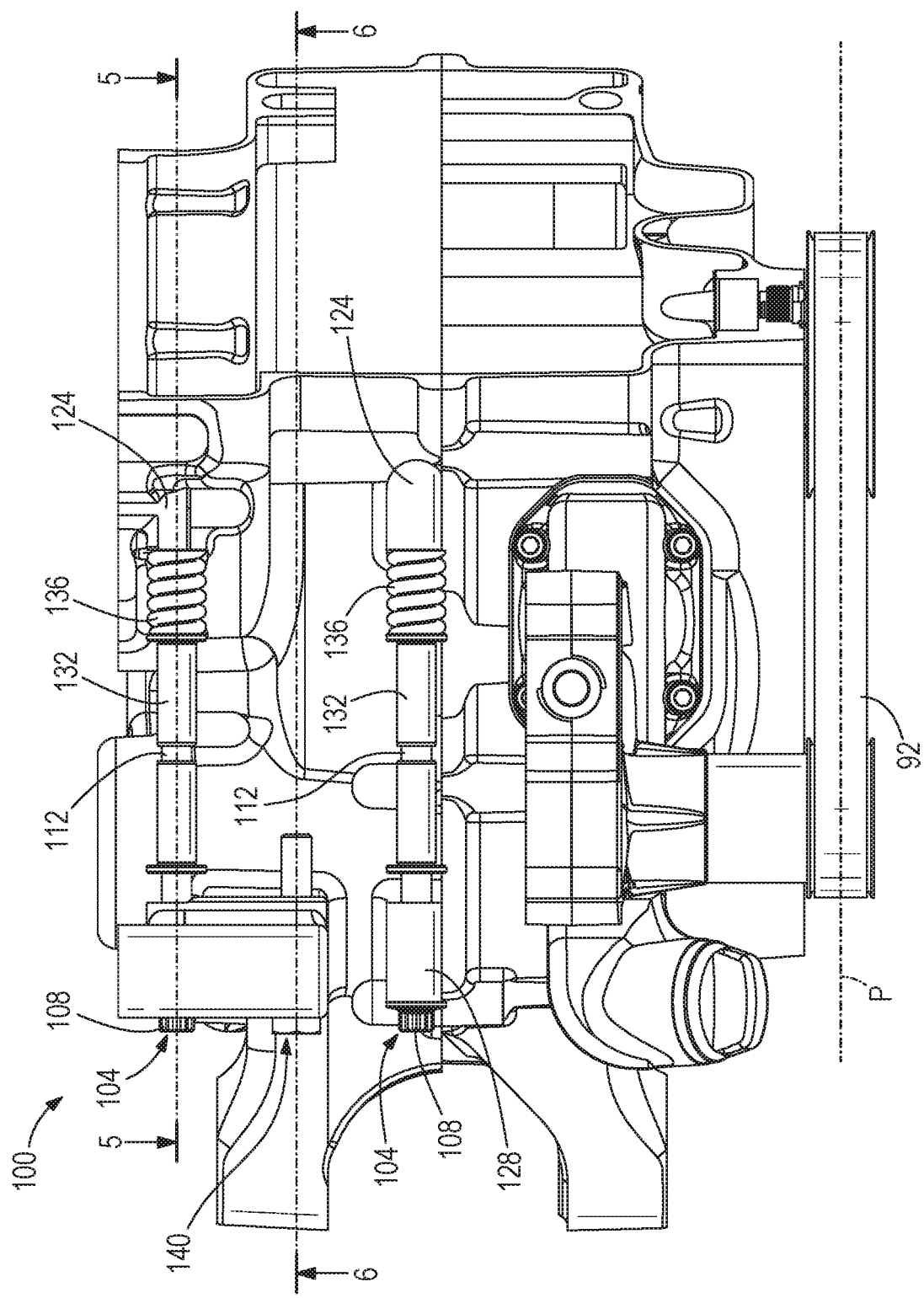
FIG. 4 is a top view of the engine, illustrating a mounting assembly or mount for the supercharger.

As shown in FIGS. 2-4, the internal combustion engine 36 is provided with an air intake system 60 including a supercharger 64. The supercharger 64 includes a rotor assembly operable to compress intake air to super-ambient pressure. In some constructions, the supercharger 64 is a positive displacement supercharger. The air intake system 60 also includes a supercharger supply conduit 68 that supplies fresh ambient air into an inlet side of the supercharger rotor assembly, and a supercharger discharge conduit 72 that supplies pressurized air from the outlet side of the supercharger rotor assembly into an intake manifold 80, which further delivers the air to intake port(s) 74 of the engine 36. In some embodiments, an intercooler 75 is located in fluid communication with the supercharger discharge conduit 72 and the intake manifold 80 of the engine 36 so that the compressed air from the supercharger discharge conduit 72 is cooled prior to delivery to the intake port(s) 74. The supercharger supply and discharge conduits 68, 72 are fixed to or integral with a housing of the supercharger 64 and form part of the supercharger assembly. The supercharger supply and discharge conduits 68, 72 each have a rigid construction as opposed to flexible hose or bellows construction. The intake manifold 80 also has a rigid construction, as does an air cleaner outlet conduit 82 that is coupled to the supercharger supply conduit 68. Both the intake manifold 80 and the air cleaner outlet conduit 82 are fixedly positioned with respect to the crankcase 76. The air cleaner outlet conduit 82 directs air to the supercharger supply conduit 68 from an air filter 84. The filtered air is then directed from the supply conduit 68 into the supercharger 64 to be compressed, then through the discharge conduit 72 and the intake manifold 80 before being supplied through the optional intercooler 75 to the engine 36 through the intake port(s) 74.

Figure 8:
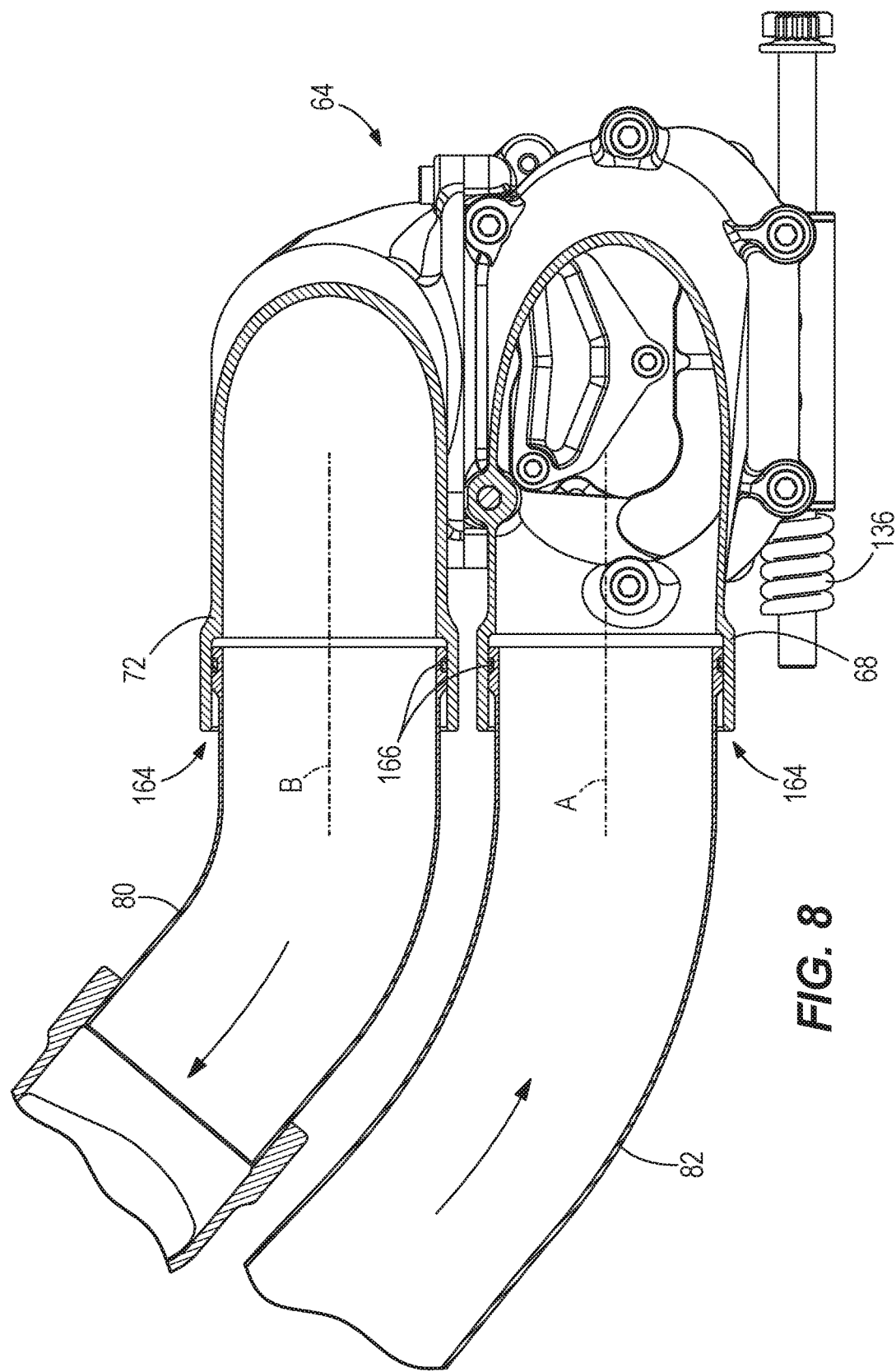
FIG. 8 is a cross-section view, taken along line 8-8 of FIG. 2, showing sliding joints of the intake system.

Respective ends of the supercharger supply conduit 68 and the air cleaner outlet conduit 82 define a mutual axis A (FIGS. 2 and 8) that is perpendicular to an axis of the crankshaft and parallel to a plane P (FIG. 4) containing an endless drive member 92 that drives the supercharger 64. Respective ends of the supercharger discharge conduit 72 and the intake manifold 80 define a mutual axis B (FIGS. 2 and 8) that is perpendicular to an axis of the crankshaft and parallel to the plane P (FIG. 4) containing the endless drive member 92. As discussed in further detail below, the components along each respective axis A, B can be slidably or telescopically joined, one inside the other. In the illustrated construction, the intake manifold 80 and the air cleaner outlet conduit 82 are received into the ends of the supercharger discharge conduit 72 and the supercharger supply conduit 68, respectively, although other couplings (e.g., reversing one or both of the male-female couplings) are provided in other constructions.

The supercharger 64 is mechanically driven from the engine 36, and can be of any type. The driven or input end of the supercharger 64 is provided by a driven member 88, such as a pulley, the rotation of which results in rotation of the supercharger rotor assembly. The driven pulley 88 is mechanically coupled to the engine 36 through an endless drive member 92. Power output from the engine 36 is transferred to a drive member 96, such as a pulley, through the crankshaft 46. More particularly, a crankshaft output 56 is provided to supply power to a secondary power take off shaft 98 which drives the endless drive member 92 using the drive pulley 96. The secondary power take off shaft 98 having the drive pulley 96 is mechanically coupled to the crankshaft 46, for example through gears, a belt, or a chain. In some constructions, the secondary power take off shaft 98 can run at double the crankshaft speed. In other constructions, the endless drive member 92 that drives the driven member 88 on the supercharger 64 can be directly coupled to the crankshaft output 56. As shown in FIG. 2, all or parts of the endless drive member 92 and the driven and drive pulleys 88, 96 can be positioned under a cover 99.

In the illustrated embodiment the endless drive member 92 is a flexible belt. Rubber or other resilient compounds are used in the construction of the flexible belt 92. The flexible belt 92 can take various forms including but not limited to a V-belt, a ribbed (e.g., multi-V) belt, or a synchronous (e.g., toothed) belt. Over time, the flexible belt 92 will lose some of its resiliency causing the material to stretch, increasing the overall length of the flexible belt 92. Lengthening of the belt 92 can cause it to slip with respect to the drive pulley 96 or driven pulley 88. Slip decreases the efficiency of the supercharger 64. To prevent slip, the flexible belt 92 must remain in tension. Tension in the belt 92 is maintained by adjusting the belt path using the mount as described below. The belt path is defined by only the drive pulley 96 and driven pulley 88 with no ancillary belt tensioner, and the belt path consists of exactly two linear sections between the respective pulleys 88, 96.

Figure 5:
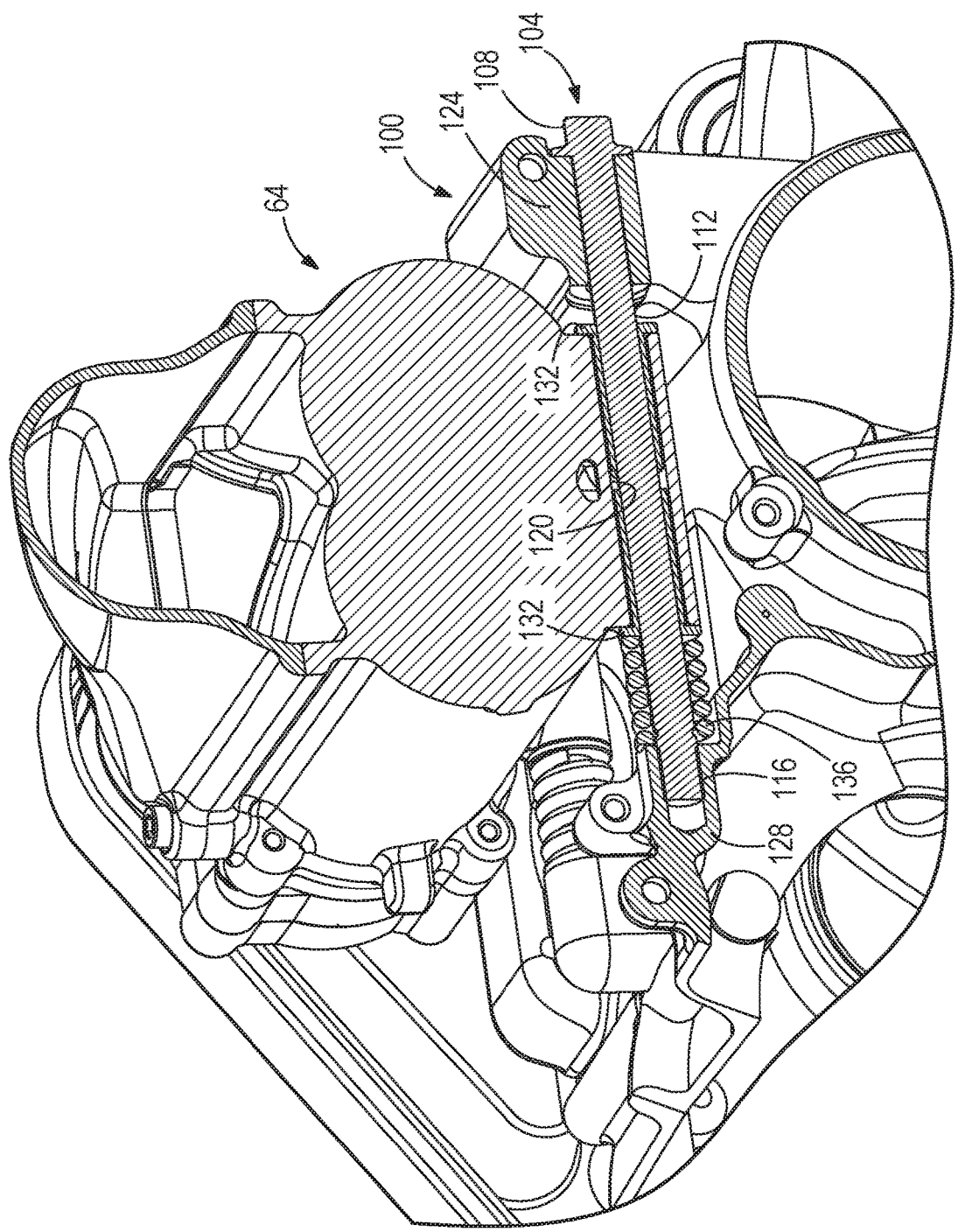
FIG. 5 is a cross-section view of the supercharger mount, taken along line 5-5 of FIG. 4.
Figure 6:
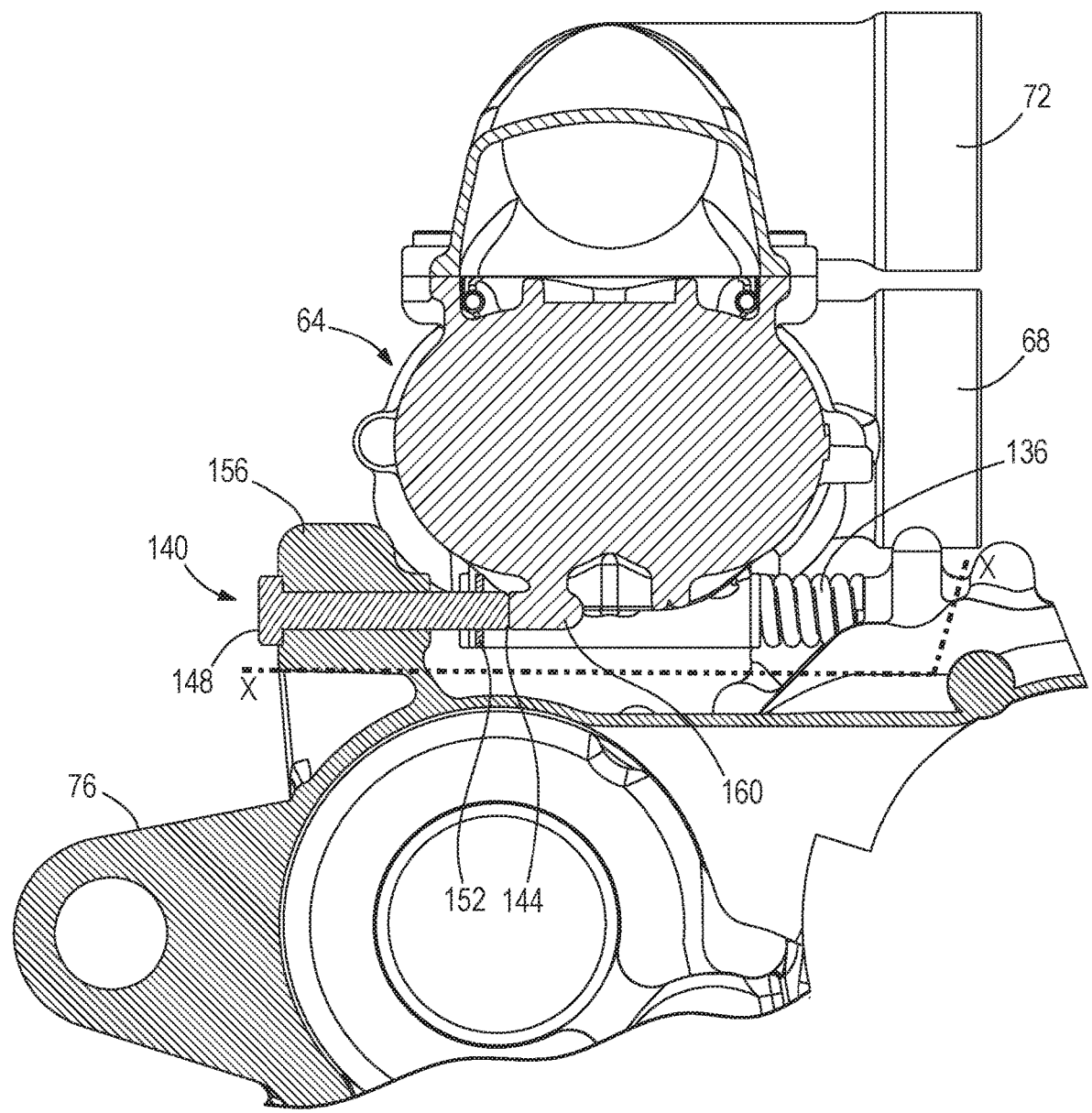
FIG. 6 is a cross-section view of the supercharger mount, taken along line 6-6 of FIG. 4 and illustrating a belt installation fastener.
Figure 7:
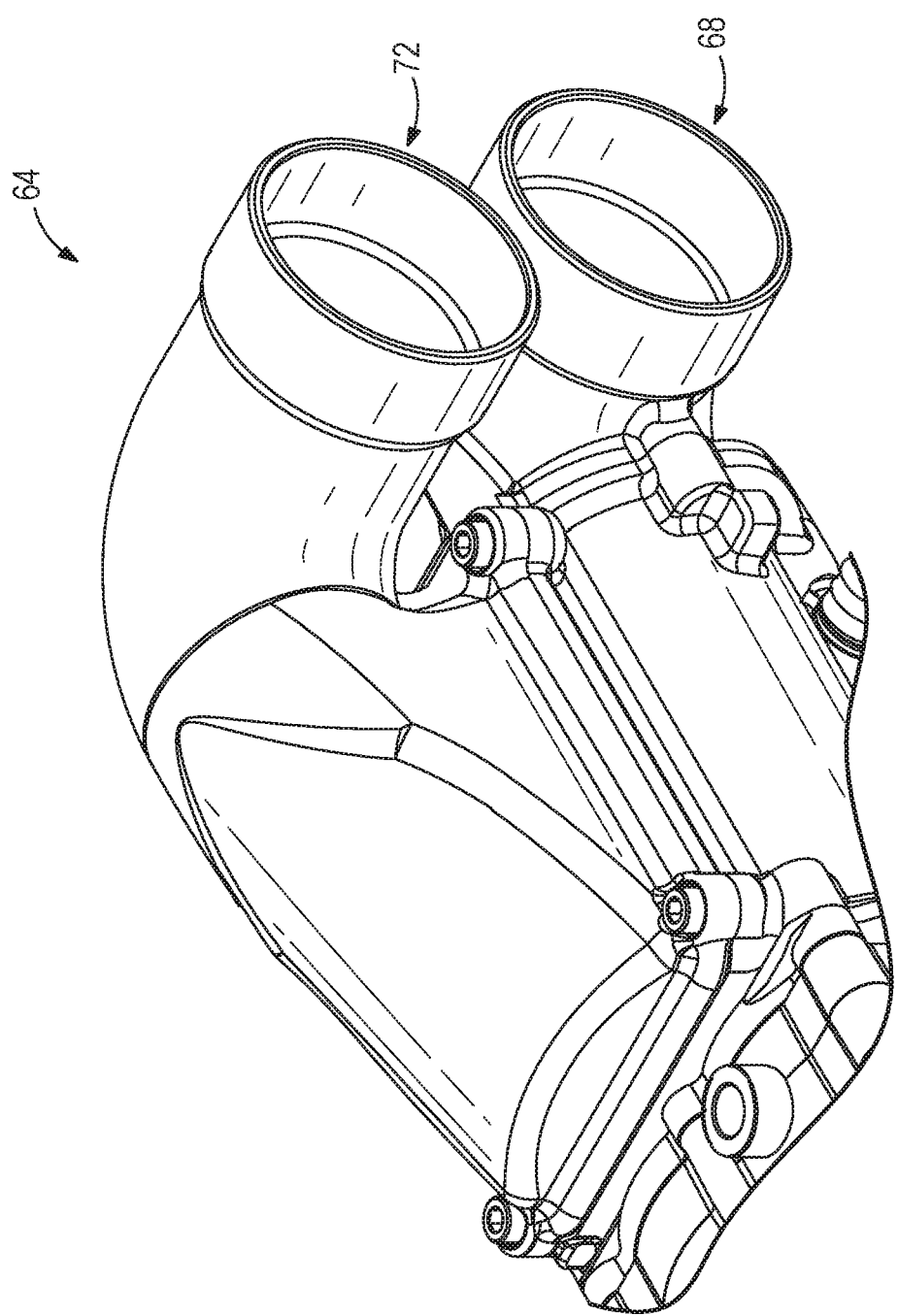
FIG. 7 is a detail view showing the intake system.

FIGS. 5 and 6 show a mount 100 forming a track for movably supporting the supercharger 64 along the track, rather than forming a fixed supercharger mount. The mount 100 supports the supercharger 64 on the crankcase 76, rearward of one or more engine cylinders. For example, the supercharger 64 can be supported rearward of a rear one of a pair of cylinders arranged in a longitudinal "V." Thus, the supercharger 64 is mounted outside the "V." The mount 100 also maintains tension in the endless drive member 92 as described in further detail below. No external belt tensioner is used. As illustrated, the track for supporting the supercharger 64 is a linear track formed from two parallel sliding rails 104, which can be bolts in some constructions. Each of the sliding rails 104 has a head 108, a smooth (e.g., cylindrical) body or shank 112, and a threaded end 116. The supercharger 64 is connected to the sliding rails 104 through holes 120 cast into the bottom of a housing of the supercharger 64, the holes 120 extending perpendicular to the rotational axis of the supercharger driven pulley 88. Although the housing of the supercharger 64 is illustrated to include integral bosses or lobes on the bottom thereof in order to provide the holes 120, in other constructions, the holes 120 may be formed in the supercharger 64 in other ways or provided by separate, securable components. Further, it is possible for the supercharger 64 to be provided with a fixed rail or rod portion that slides within a guide aperture or slot on the engine (e.g., crankcase 76). In other words, the illustrated male-female coupling can be reversed.

Along the path of each of the holes 120 is a first (rear) and a second (forward) boss 124, 128. As illustrated, the bosses 124, 128 are cast bosses formed integrally in the crankcase 76. However, in other constructions, the bosses 124, 128 or similar structure may be provided separately from the crankcase 76 and fixedly secured thereto (e.g., by bolts and/or welding) as an adapter. For example, the portion of the crankcase 76 illustrated above the line X-X in FIG. 6 may be a separate adapter plate configured for connection with the crankcase 76. The rear cast boss 124 has a through hole for insertion of the corresponding sliding rail 104. The forward cast boss 128 has a threaded hole, e.g., blind threaded hold, to receive the threaded end of the corresponding sliding rail 104. Sufficient clearance exists between the bosses 124, 128 of the crankcase 76 to allow for the supercharger 64 to move fore and aft along the sliding rails 104. Low friction material guides or bushings 132 are press fit into the holes 120 on the bottom of the supercharger 64. As illustrated, two bushings 132 are inserted into each hole 120, one from each end. Each bushing 132 has a flange or shoulder limiting the insertion depth. The bushings 132 can be made of Torlon, Teflon, self-lubricating graphite impregnated bronze, or similar materials. The bushings 132 are sized to have a tight sliding fit on the sliding rails 104 to prevent any lateral movement or rotation due to belt tension. There is a natural tendency to produce yaw around a vertical axis of the supercharger assembly, as the belt tension is only exerted on one side of the supercharger 64. Yaw is controlled by the tight clearances between the bushings 132 and the sliding rails 104. It is also limited by making the sliding rails 104 as long and spaced out as possible creating a wide mounting base.

FIGS. 4 and 5 depict at least one biasing device 136 adapted to urge the supercharger 64 on the sliding rails 104 along a biasing direction. The illustrated embodiment utilizes a coil spring on each sliding rail 104 as the biasing device 136. The coil springs 136 are located between the second (forward) bosses 128 of the mount 100 and the supercharger 64. The coil springs 136 may contact end faces of the respective bushings 132, or the housing of the supercharger 64 directly. It will be appreciated that other spring types and configurations are possible in other constructions, as long as the springs, when loaded or strained, are configured to provide a force that urges the supercharger 64 away from the drive pulley 96 to apply tension to the belt 92.

The sliding rails 104 enable the mount 100 to support the supercharger 64 with a restricted freedom of movement, particularly a single axial or translatory degree of freedom. The sliding rails 104 provide sliding support of the supercharger 64 relative to the crankcase 76, the coil springs 136 providing self-adjustment of the distance between the drive pulley 96 and the driven pulley 88 of the supercharger 64. In other words, the supercharger 64 is not fixed-mounted on the engine 36, but rather spring-biased into an operating position, the mount 100 affording the supercharger 64 the ability for incremental movement along the engine 36. For a fixed belt length, the springs 136 provide a prescribed belt tension. Momentary increase in belt tension corresponds to additional strain in the springs 136, from which the springs 136 will rebound and re-set the prescribed belt tension. Furthermore, as the belt 92 stretches over the course of its useful life, the springs 136 adjust the operating position of the supercharger 64 further from the drive pulley 88 so that the springs 136 maintain operating tension.

FIG. 6 also shows an integral belt installation aid 140. As illustrated, the integral belt installation aid 140 is a fastener, e.g., a threaded fastener such as a screw or bolt. The belt installation fastener 140 has a distal end 144 opposite a head end 148. The head end 148 can have a hex shape or other engagement feature for a rotary tool. In some constructions a retaining ring 152 is engaged on the installation fastener 140 between the distal end 144 and the head end 148. A first boss 156 including an aperture for passage of the installation fastener 140 is provided on the crankcase 76 (e.g., integrally cast or fixedly secured). The first boss 156 can be opposite the coil springs 136 for directing and supporting the installation fastener 140. A second boss 160 on the bottom of the supercharger 64 is aligned with the first boss 156, and the aperture thereof, along the axis of the installation fastener 140. The second boss 160 provides a surface (e.g., flat surface) on the supercharger 64 for the belt installation fastener 140 to physically engage during a belt installation procedure. The aperture in the first boss 156 can be threaded to enable the installation fastener 140 to be screwed into and out of the first boss 156.

Assembly requires lowering the supercharger 64 along with the coil springs 136 into the space between the bosses 124, 128 cast in the top of the crankcase 76. The sliding rails 104 are then installed (e.g., from the rear). The sliding bolts 104 can be installed by passing through the aft cast boss 124 on the crankcase 76, through the bushings 132 in the supercharger 64, through the coil springs 136, and threaded into the forward cast bosses 128 on the crankcase 76. As a result of the coil springs 136 being in their extended or natural position at assembly, the supercharger 64 is positioned to the far left as shown in FIGS. 3 and 4, corresponding to a full aft position in which the coil springs 136 maintain the supercharger 64 at a distance as far as possible from the drive pulley 96. The belt installation fastener 140 is then threaded into the first boss 156 and used to push the supercharger 64 toward the drive pulley 96, shortening the distance thereto and applying a preload strain to the coil springs 136 so that the belt 92 can be installed more easily over the drive pulley 96 and the driven pulley 88. The installation fastener 140 can over-strain the coil springs 136 with respect to an operating belt tension and corresponding operating spring strain. In other words, when the installation fastener 140 is put into the engaged position, the belt 92 can be installed without first applying the operating tension. Rather, the belt 92 can be installed with a substantially lesser amount of tension, or no tension at all. Once the belt 92 is installed, the belt installation fastener 140 is released or reversed (e.g., by unthreading) so that the coil springs 136 release strain energy and expand to push the supercharger 64 away from the drive pulley 96 (e.g., rearward). However, the coil springs 136 are not fully relaxed, but rather are limited in their release by the belt 92, which in turn is tensioned to the operating tension by the coil springs 136. The belt installation fastener 140 is backed out of the first boss 156 until the retaining ring 152 is in contact with the boss 156, locking the installation fastener 140 into a fixed position disengaged from the supercharger 64. Alternatively, the belt installation fastener 140 can be removed entirely from the first boss 156, for example if no retaining ring 152 is present.

In a different embodiment where an adapter plate subassembly (i.e., having the mount 100 as illustrated, but without integral mounting between the sliding rails 104 and the crankcase 76) is used, the springs 136 and the sliding rails 104 can be pre-installed to the supercharger 64 before mounting to the engine 36. The supercharger sub-assembly, including the sliding mount 100, is then mounted (e.g., mounted securely in a fixed position) to the crankcase 76 of the engine 36. The supercharger with adapter plate subassembly mount can be provided in the same location as shown with the integral mount 100. Attachment of the adapter plate can be made via direct mounting of the adaptor plate to the rear of the crankcase 76. However, the adapter plate can be mounted with removable fasteners (e.g., bolts) in some constructions so as to enable simplified removal of the supercharger assembly, for example, to conduct service operations on the supercharger 64 or other portion of the engine 36. In some constructions, the supercharger 64 (and optionally, the adapter plate mounting) can be removed from the engine 36 while the engine 36 remains mounted in the frame 22.

Whether during installation or over the course of belt life, including belt stretch, the supply and discharge conduits 68, 72 of the air intake system 60 move with the supercharger 64. The rigid supply and discharge conduits 68, 72 are oriented parallel to the movement axis of the supercharger 64. A first sliding joint 164 is formed between the supercharger supply conduit 68 and the air filter outlet conduit 82 (e.g., a linear or axial portion thereof), and a second sliding joint 164 is formed between the supercharger discharge conduit 72 and the engine intake manifold 80 (e.g., a linear or axial portion thereof). The sliding joints 164 allow the supercharger 64 to translate during use, without stressing or flexing joints in the intake system 60 in order to maintain little to no leakage and promote long product life. One or more seal rings 166, e.g., O-rings, are provided in each joint 164.

Various features and advantages of the disclosure are set forth in the following claims.

What is claimed is:

1. A supercharged engine comprising:
a crankshaft operable to receive and output power produced by combustion within the engine;
a case in which the crankshaft is rotatably supported;
a supercharger driven from the crankshaft by an endless drive member, wherein the supercharger is adapted to compress intake air supplied to the engine when driven from the crankshaft; and
a mount having a track supporting the supercharger for sliding movement relative to the case so that tension in the endless drive member is adjustable and set in relation to a position of the supercharger relative to the case,
wherein the mount is self-adjusting to maintain an operating tension in the endless drive member.

2. The supercharged engine of claim 1, wherein the track is a linear track supporting the supercharger for translatory motion relative to the case.

3. The supercharged engine of claim 1, wherein the mount comprises a spring, and strain within the spring is configured to maintain the operating tension in the endless drive member.

4. The supercharged engine of claim 3, further comprising an installation fastener operable in an engaged position to hold the spring in an over-strained state in which the endless drive member can be installed without first applying the operating tension, the installation fastener being releasable to allow the spring to apply the operating tension to the endless drive member.

5. The supercharged engine of claim 1, wherein the endless drive member is wrapped around a driven wheel of the supercharger and around a drive wheel that receives power from the crankshaft, and wherein the endless drive member defines exactly two linear belt paths between the driven wheel and the drive wheel.

6. The supercharged engine of claim 1, wherein tension in the endless drive member is set by the mount, without any ancillary tensioners.

7. The supercharged engine of claim 1, wherein the track of the mount is defined by two parallel rails.

8. The supercharged engine of claim 1, wherein a rear portion of the engine is adapted for connection to a transmission, and wherein the engine includes plural cylinders, the rearmost of which is positioned forward of the supercharger.

9. The supercharged engine of claim 1, wherein the engine includes first and second cylinders arranged in the shape of a "V," and the supercharger is positioned outside the "V".

10. The supercharged engine of claim 1, wherein the supercharger forms part of an air intake system of the engine, the air intake system further including an air filter, a supercharger supply conduit fixed relative to the case, a supercharger discharge conduit fixed relative to the case, and an intake manifold adapted to supply air charged by the supercharger into at least one cylinder of the engine, and wherein respective sealed, sliding joints are formed with the supercharger by each of the supercharger supply conduit and the supercharger discharge conduit.

11. The supercharged engine of claim 10, wherein the air intake system further comprises an intercooler positioned between the engine intake manifold and an outlet of the supercharger coupled to the supercharger discharge conduit.

12. A supercharged engine comprising:
an air intake system including a supercharger operable to supply compressed air to an intake manifold of the engine, wherein the supercharger is supported on the engine for sliding movement by a mount having a track; and
an endless drive member wrapped around a driven wheel of the supercharger and around a drive wheel supplied with power from a crankshaft of the engine to which at least one piston of the engine is joined, wherein the endless drive member defines a first linear belt path from the driven wheel to the drive wheel, and a second linear belt path from the drive wheel to the driven wheel.

13. The supercharged engine of claim 12, wherein the mount is self-adjusting to maintain an operating tension in the endless drive member by way of strain within a spring of the mount.

14. The supercharged engine of claim 13, further comprising an installation fastener operable in an engaged position to hold the spring in a state in which the endless drive member can be installed without first applying the operating tension, the installation fastener being releasable to allow the spring to apply the operating tension to the endless drive member.

15. The supercharged engine of claim 12, wherein tension in the endless drive member is set by the mount, without any ancillary tensioners.

16. The supercharged engine of claim 12, wherein the track is a linear track supporting the supercharger for translatory motion relative to the case.

17. The supercharged engine of claim 12, wherein the track of the mount is defined by two parallel rails.

18. The supercharged engine of claim 12, wherein a rear portion of the engine is adapted for connection to a transmission, and wherein the engine includes plural cylinders, the rearmost of which is positioned forward of the supercharger.

19. The supercharged engine of claim 12, wherein the engine includes first and second cylinders arranged in the shape of a "V," and the supercharger is positioned outside the "V".

20. The supercharged engine of claim 12, wherein the air intake system of the engine further includes an air filter, a supercharger supply conduit fixed relative to a case of the engine, a supercharger discharge conduit fixed relative to the case, and the intake manifold, and wherein respective sealed, sliding joints are formed with the supercharger by each of the supercharger supply conduit and the supercharger discharge conduit.

* * * * *